United States Patent [19]

Smith

[11] Patent Number: 4,609,417

[45] Date of Patent: Sep. 2, 1986

[54] CAPSULE SEALER AND METHOD OF SEALING

[75] Inventor: Franklin J. Smith, Diablo, Calif.

[73] Assignee: Microdry Corporation, San Ramon, Calif.

[21] Appl. No.: 592,569

[22] Filed: Mar. 26, 1984

[51] Int. Cl.$^4$ .......................... B65B 7/00; B32B 31/00; B65D 83/04
[52] U.S. Cl. .................... 156/69; 156/272.4; 156/272.2; 156/275.1; 156/293; 156/308.4; 156/381; 156/423; 156/379.6; 53/266 R; 53/329; 53/454; 206/530; 206/807
[58] Field of Search ............... 156/423, 69, 73.5, 293, 156/305, 580, 381–382, 308.4, 379.6, 272.2, 272.4, 275.1, 275.7; 53/266, 271, 330, 331, 329, 452, 454, 566; 425/804; 427/2, 3, 377–378, 45.1, 46; 428/916; 424/2, 14, 21, 37; 422/26, 21; 206/528, 530, 807

[56] References Cited

U.S. PATENT DOCUMENTS

| | | | |
|---|---|---|---|
| 1,861,047 | 5/1932 | Colton | 206/807 |
| 2,738,827 | 3/1956 | Roll | 53/131 |
| 3,078,629 | 2/1963 | Besemer et al. | 53/471 |
| 3,200,556 | 8/1965 | Ackley | 53/485 |
| 4,035,547 | 7/1977 | Heller, Jr. et al. | 156/272.4 |
| 4,039,795 | 8/1977 | Laszlo et al. | 198/560 |
| 4,224,348 | 9/1980 | Hayashi et al. | 426/234 |
| 4,390,482 | 6/1983 | Feurer | 264/25 |
| 4,456,498 | 6/1984 | Churchland | 156/273.7 |

Primary Examiner—Edward Kimlin
Assistant Examiner—Merrell C. Cashion, Jr.
Attorney, Agent, or Firm—Edmond T. Patnaude

[57] ABSTRACT

The two halves of medicine-filled, gelatin capsules are fitted together and passed through a field of microwave energy to selectively melt the overlapping portions of the two halves whereby they become sealed together when the capsules are removed from the microwave energy field and permitted to cool.

16 Claims, 7 Drawing Figures

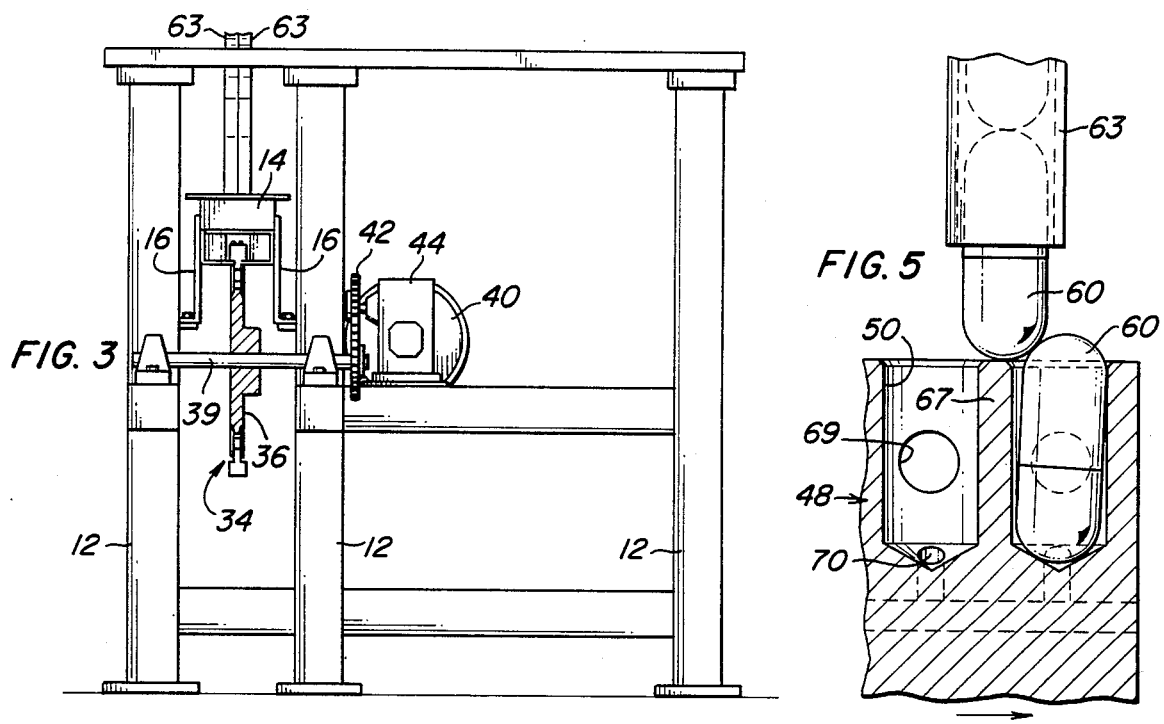
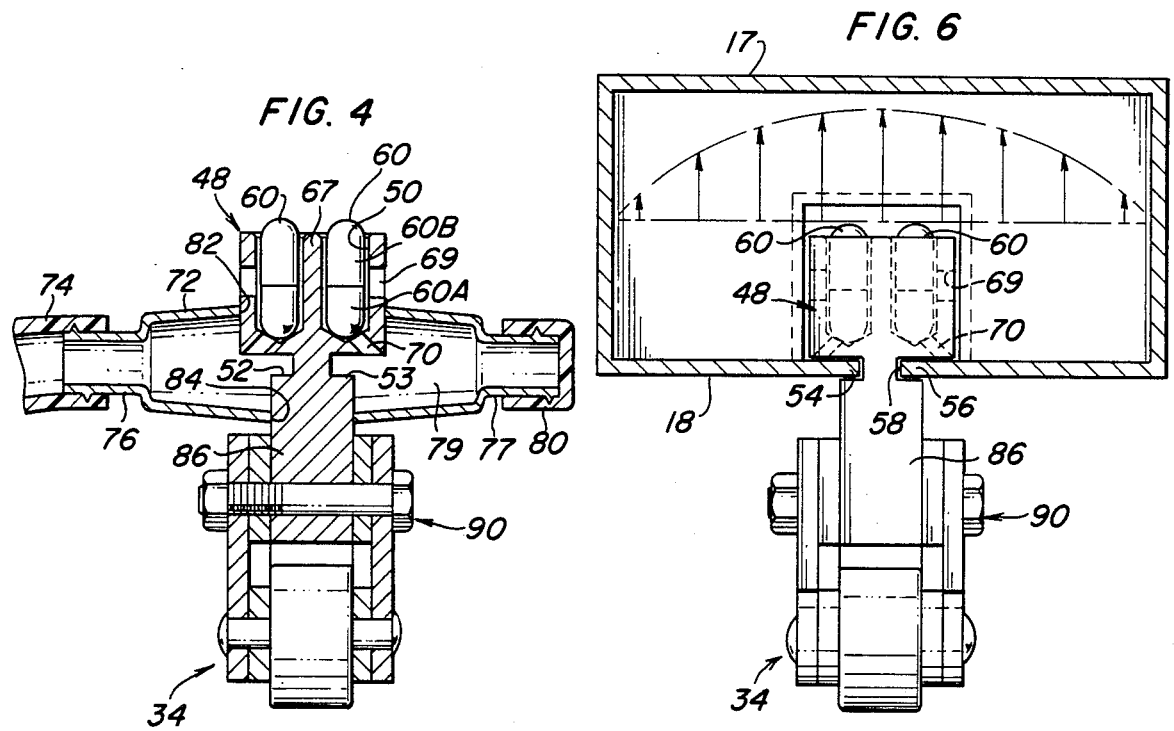
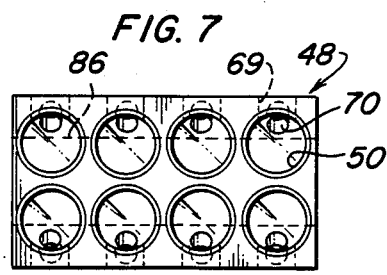

4,609,417

CAPSULE SEALER AND METHOD OF SEALING

The present invention relates in general to a method and apparatus for sealing together the two parts of gelatin capsules, and it relates more particularly to the use of microwave energy in such method and apparatus.

BACKGROUND OF THE INVENTION

For many years medicines and food supplements have been packaged in edible capsules molded of gelatin. When such a capsule is ingested, the gelatin capsule dissolves to permit the body to absorb the contents of the capsule.

Such capsules have generally included two parts, one fitting snugly within the other, and a small ridge on one of the parts provides a slight locking action to keep the two parts together. However, the two parts can be manually separated.

There is a need for a positive seal between the two parts of the capsule to deter contamination of the contents of the capsule.

SUMMARY OF THE INVENTION

Briefly, there is provided in accordance with the present invention a new and improved method and apparatus using microwave energy to melt or soften the interfitting portions of prefilled gelatin capsules. When the capsules are subsequently cooled, the interfitting portions fuse together to seal the two parts together to prevent them from being separated without destruction of the capsule.

In a preferred embodiment of the invention, the capsules are generally cylindrical, and the prefilled and assembled, generally cylindrical capsules are carried through a microwave heating chamber with the long axis of the capsules lying parallel to the microwave electric field in the chamber. Because the assembly is thickest at the location where the two parts overlap, that portion of the capsule wall absorbs more heat than the other portions of the capsule thereby to be preferentially heated.

In the apparatus shown and described herein, the capsules are fed one by one into cylindrical pockets provided in a plurality of carriers respectively attached to individual links of a conveyor chain located a short distance below the bottom wall of a microwave chamber excited in the TE01 mode. The carriers extend upwardly into the microwave chamber through a centrally disposed, narrow guide slot in the bottom wall of the chamber. The portions of the wall defining the guide slot extend into shallow guide grooves on opposite sides of the carriers thereby to guide the carriers along the central vertical plane of the chamber.

GENERAL DESCRIPTION OF THE DRAWING

The present invention will be better understood by a reading of the following detailed description taken in connection with the accompanying drawings wherein:

FIG. 3 is an end view of the capsule sealer of FIG. 1 taken from the right hand side thereof;

FIG. 4 is a cross-sectional view taken along the line 5—5 of FIG. 1;

FIG. 5 is a cross-sectional view taken along the line 5—5 of FIG. 1;

FIG. 6 is a cross-sectional view taken along the line 6—6 of FIG. 1; and

FIG. 7 is a top view of one of the novel capsule carrier blocks used in the capsule sealer of FIG. 1.

DETAILED DESCRIPTION OF A PREFERRED EMBODIMENT OF THE INVENTION

Figure 2:
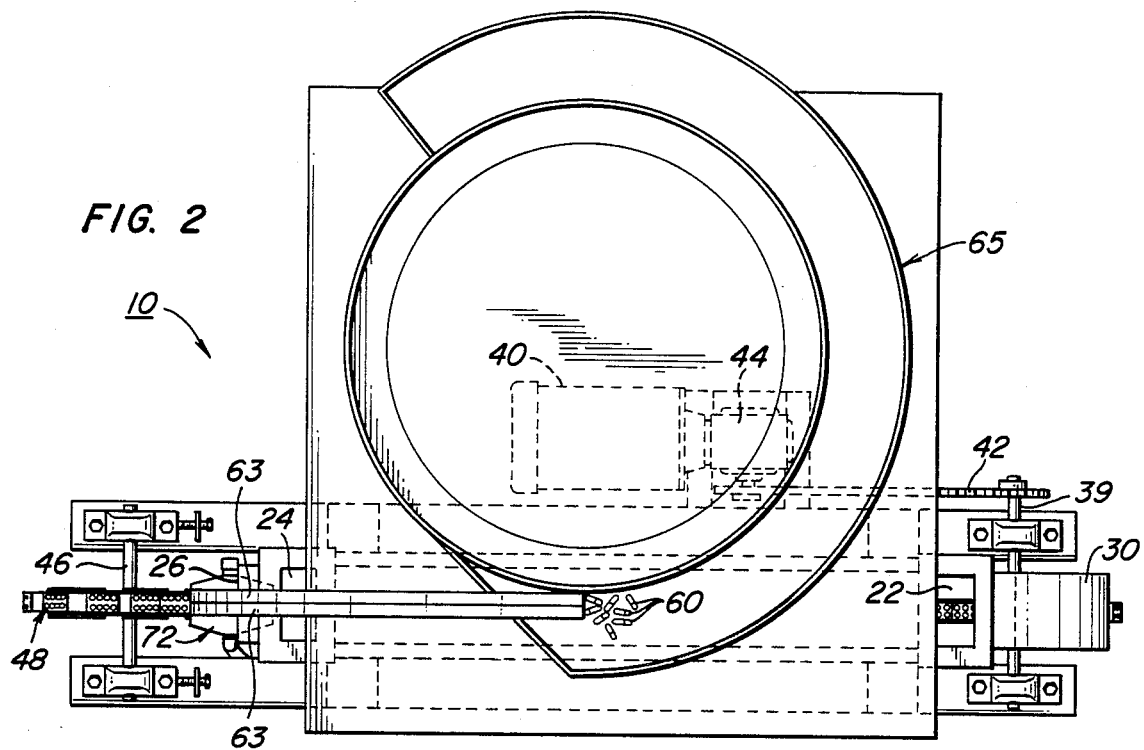
FIG. 2 is a top plan view of the capsule sealer shown in FIG. 1.
Figure 1:
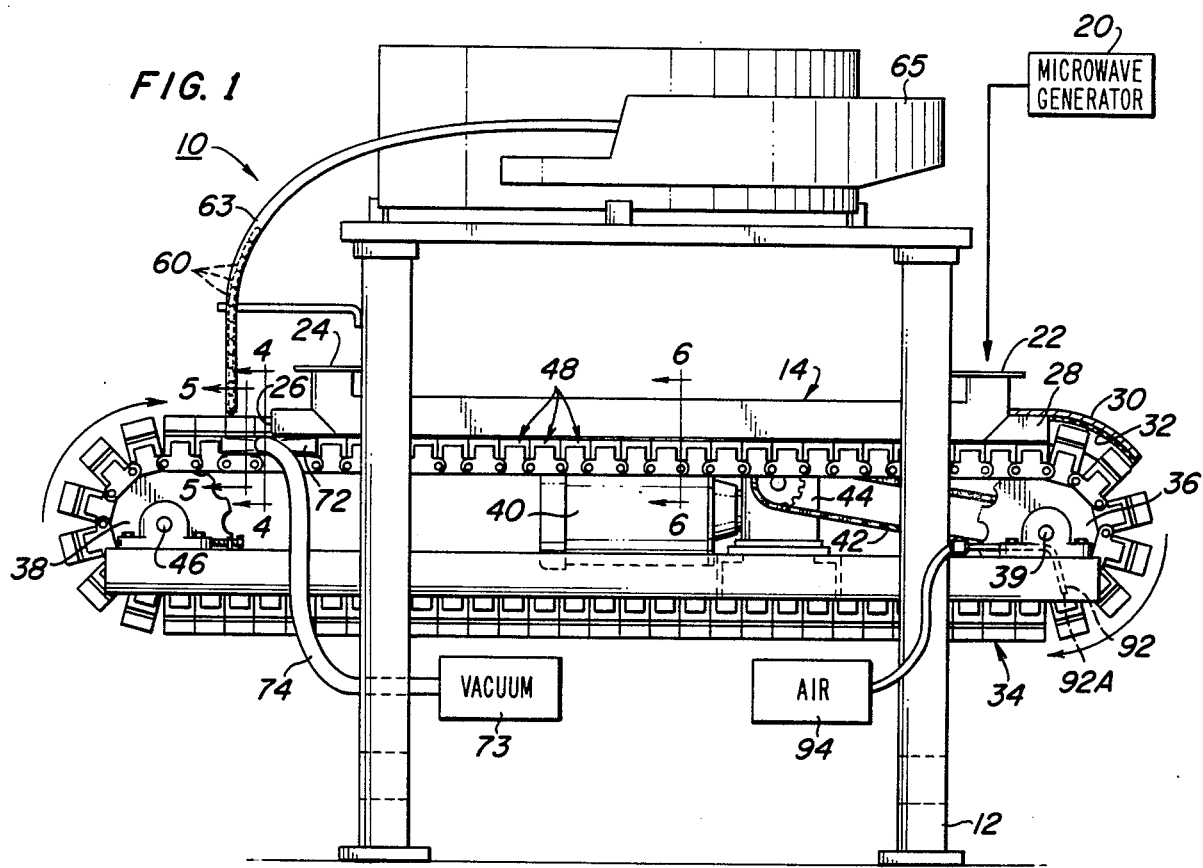
FIG. 1 is an elevational view, partly in cross-section, of a capsule sealer embodying certain aspects of the present invention.

Referring now to the drawings and particularly to FIGS. 1, 2 and 3 thereof, a capsule sealing machine 10 may be seen to include a plurality of posts 12 to which an elongated, horizontally disposed microwave heating chamber 14 is fixedly mounted by means of a plurality of angle brackets 16. The chamber 14 is rectangular in cross-section with its broad walls 17 and 18 respectively located at the top and bottom. A microwave generator 20 supplies microwave energy to the applicator chamber 14 through an upstanding microwave energy inlet port 22 at one end of the chamber. An upstanding microwave energy outlet port 24 is provided at the other end of the chamber so that a suitable termination may be connected thereto. A microwave electro-magnetic field in the TE01 mode, as more fully described hereinafter, is thus established in the applicator chamber.

A rectangular, product inlet port 26 is provided at the left hand end of the chamber 14, and a rectangular product outlet port 28 is provided at the right hand end of the chamber 14. A guard plate 30 having a microwave energy absorbing liner 32 extends above and outwardly from the port 28 to limit the amount of microwave energy which escapes to the ambient from the product outlet port 28.

In order to carry the capsules through the microwave applicator chamber 14 there is provided a multi-link conveyor chain 34 carried by a drive sprocket 36 and an idler sprocket 38, the drive sprocket being affixed to a drive shaft 39 which is coupled to an electric drive motor 40 by a drive chain 42 and a speed reducer 44. The idler sprocket 38 is affixed to a shaft 46 which is suitably journaled to the frame of the machine.

As best shown in FIGS. 1 and 4, a plurality of capsule carrier blocks 48 are respectively connected to the links of the chain 34 as best shown in FIGS. 1 and 4 and are each provided with a plurality of cylindrical pockets 50 in which the capsules are carried. The carrier blocks 48 are formed of a suitable plastic such as polypropylene or of some other non-conductive material. Each of the carrier blocks 48 is provided with a pair of coplanar, horizontal guide grooves 52 and 53 which, as best shown in FIG. 6, receive slot-defining edge portions 54 and 56 of the bottom wall 18 of the chamber 14. These edge portions define a centrally disposed, rectilinear slot 58 through which the carrier blocks extend as they transport the capsules through the microwave energy field in the applicator chamber. It may thus be seen that the links of the conveyor chain 34 are disposed below the bottom wall of the chamber 14 with the carrier blocks extending up through the slot 58 into the microwave heating chamber.

The pockets 50 are cylindrical, and each holds one capsule 60 with the principal longitudinal axis of the capsule being substantially vertical when the capsule is carried through the chamber 14. As best shown in FIG. 4, the capsule 60 has a first part 60A including a tubular cylindrical portion which fits snugly into a tubular cylindrical portion of a second part 60B. The parts 60A and 60B are molded of a dielectric material such as gelatin and may be seen to have spherical ends. The interengaging tubular portions of the capsule are thin walled cylindrical sections, and being parallel with the microwave electric field in the chamber, much higher electric field strengths are induced in these walls than in the other parts of the capsules.

The rectangular chamber 14 is excited in the TE01 mode, and as shown by the arrows in FIG. 6, the direction and strength of the microwave electric field in the chamber 14 is symmetrical relative to the central vertical plane of the waveguide and the field is strongest at the center of the chamber. Since the carriers 48 travel along this vertical plane and include two rows of pockets respectively disposed on opposite sides of the vertical center line of the chamber, all of the capsules 60 pass through portions of the microwave field which are of equal strength. Therefore, the capsules are equally heated as they pass through the heating chamber 14.

As best shown in FIG. 5, the length of each of the pockets 50 is slightly less than the overall length of the capsules 60 so that the spherical upper ends of the capsules protrude from the tops of the pockets. Consequently, as the carriers pass beneath a pair of capsule feeder tubes 62 and 63 before entering the chamber 14 the capsules drop one by one into the empty pockets as the carriers move toward the entrance 26 of the heating chamber 14.

Considered in greater detail and with particular reference to FIGS. 1 and 2, the feeder tubes 62 and 63, which are circular in cross-section, extend downwardly from a hopper 65 containing a supply of the prefilled, preassembled capsules. By any suitable means, such as a vibratory feeder, the capsules are fed one by one into the tops of the feeder tubes 62 and 63. As may be seen in the drawings, the inner diameter of the feeder tubes is only slightly larger than the cross-sectional diameter of the capsules 60, and when necessary or desirable air may be blown into the tubes to force the capsules down through the tubes. The lower end of each of the feeder tubes is above one of the rows of pockets 50 so that as an empty pocket passes under the respective feeder tube, the lowermost capsule in the tube drops or is otherwise forced down into the empty pocket.

As shown by the arrow in FIG. 5, with the carrier block 48 moving to the right, the right hand pocket 50 is filled first and the next adjacent capsule in the feeder tube then rides across the spherical top surface of the capsule in the pocket, then across the top of the narrow wall 67, and then drops into the next open pocket. In order to release air quickly from the pockets as the capsules are dropped therein, venting passageways 69 and 70 extend through the carrier blocks from the pockets 50 to the exterior sides of the blocks.

In a preferred embodiment of the invention a vacuum manifold 72 is provided at the fill station to draw the capsules down into the pockets 50 thereby to assist in seating and holding the capsules in place in the carrier blocks. The manifold 72 is connected to a vacuum source 73 by a flexible tube 74.

Referring to FIG. 4, it may be seen that the manifold 72 has a pair of tubular exhaust ports 76 and 77 on opposite sides of a sealed vacuum chamber 79. Two ports are provided for convenience in connecting the chamber to a vacuum pump or other vacuum source. Only the port 76 is used in the illustrated machine, and the port 77 is sealably closed by a cap 80. The manifold 72 is provided at the top with a rectilinear slot 82 aligned with the slot 58 in the bottom wall of the chamber 14. The width of the slot 82 is slightly greater than the widths of the carrier blocks 48. A similar slot 84 is provided at the bottom of the manifold and receives the lower portions of the carrier blocks passing therethrough.

It may thus be seen that the carrier blocks 48 each includes two rows of vertically oriented pockets 50 at the top, a pair of coplanar guide grooves 52 and 53, and a depending, generally rectangular portion 86 which is attached to a link of the conveyor chain 34 by a pair of nut and bolt assemblies 90.

After leaving the heating chamber 14 the carrier blocks 48 pass in an inverted position beneath a pair of air ejector tubes 92 which are connected to a source of pressurized air 94. The holes 70 in the carrier blocks extend at an angle of about forty-five degrees relative to the longitudinal axis of the associated pocket and as these holes pass across the open ends 92A of the tubes 92 the jets of air emitted by the tubes blow down into the holes 70 to eject the capsules from the pockets. Suitable means for receiving the ejected capsules, such as a conveyor belt, may be located below the tubes 92 for carrying the sealed capsules to a packaging station.

The present invention thus provides a method and apparatus which uses microwave energy to seal the two parts of medicinal type capsules together. Because of the orientation of the capsules in the microwave electromagnetic field, the contents of the capsules remain at a temperature at which no damage occurs nor is the capsule itself damaged. Because the thickness of the capsule is twice as great through the section where the two parts of the capsule overlap, and because that part of the capsule is aligned with the electric field in the chamber, the overlapping parts are heated to a substantially higher temperature than is the remainder of the capsule and its contents. By controlling the strength of the microwave field and the residence time of the capsules in the chamber 14, only the overlapping portions of the capsule parts are raised to the temperature at which the gelatin or other material begins to melt and becomes tacky. When the capsules leave the chamber and are subsequently cooled, the partially melted, overlapping portions of the capsules fuse together as they return to the solid state.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A method of sealing together the interfitted tubular portions of a pair of dielectric container members, comprising the steps of transporting said interfitted tubular portions of said container members through a waveguide, said waveguide having a wall with a slot therein extending in a direction parallel to the longitudinal axis of the waveguide, said container members being transported by a dielectric carrier received within the slot of said wall, exciting said waveguide with microwave energy to develop in said waveguide an electric field extending parallel to the axis of said tubular portions as they travel through said waveguide, controlling the strength of said electric field and the residence time of said container members in said waveguide to cause only said interfitted portions of said container members to melt, and permitting said interfitted tubular container portions to cool and thereby to become fused together.

2. The method according to claim 1 wherein
said interfitted container members provide a capsule, said waveguide is rectangular, and
said electric field is perpendicular to one broadwall of said waveguide.

3. The method according to claim 2 wherein said capsule members are formed of gelatin and contain an edible product when transported through said waveguide.

4. The method according to claim 3 wherein said edible product is a pharmaceutical preparation.

5. The method according to claim 2 wherein
said microwave energy is in the TE01 mode.

6. The method according to claim 5 wherein
said containers are transported through said waveguide in two groups,
said groups being respectively transported along parallel paths equidistant from the longitudinal centerline of said one broadwall.

7. Apparatus for use in sealing together interfitted, tubular members formed of a heat soluble, dielectric material, comprising in combination
a rectangular waveguide,
a conveyor disposed adjacent the exterior side of one wall of said waveguide for travel in a direction parallel to the longitudinal axis of said waveguide,
said wall having a slot therein extending in a direction parallel to said axis,
a plurality of dielectric carriers mounted to said conveyor and partially disposed in said waveguide with the longitudinal edges of said slot extending into respective ones of oppositely disposed, coplanar grooves in said carriers,
at least one pocket is provided in each of said carriers for receiving one assembled pair of said interfitted tubular members, said pocket being disposed within said waveguide to carry said members therethrough, and
means for exciting said waveguide with microwave energy.

8. Apparatus as set forth in claim 7 wherein
said means for exciting said waveguide excites said waveguide in the TE01 mode.

9. Apparatus as set forth in claim 8 wherein
said carriers are provided with two rows of recesses for respectively receiving one pair of said interfitted tubular members.

10. Apparatus as set forth in claim 7 wherein
said conveyor includes a chain of interconnected links, and
each of said carriers is connected to a respective one of said links.

11. Apparatus as set forth in claim 7 comprising
a product inlet opening at one end of said waveguide through which said carriers enter said waveguide,
a product outlet opening at the other end of said waveguide through which said carriers leave said waveguide, and
a plurality of passageways respectively extending from the exteriors of said carriers to a location in proximity with the bottoms of said pockets.

12. Apparatus as set forth in claim 11 comprising
vacuum manifold means disposed in proximity to said product inlet opening and cooperating with said passageways to suck said capsules toward the bottoms of said pockets.

13. Apparatus as set forth in claim 11 comprising
feeder tube means containing a plurality of said capsules arranged in end to end relationship,
said tube means being diposed ahead of said product inlet opening directly over the path of travel of said pockets for feeding said capsules into said pockets as they pass beneath said tube means.

14. Apparatus as set forth in claim 11 comprising
ejector means including a nozzle disposed adjacent the path of travel of said carriers after they leave said waveguide for directing a stream of air into said passageways to blow said capsules out of said pockets.

15. Apparatus as set forth in claim 7 wherein
said waveguide extends in a horizontal direction,
said one wall being at the bottom of said waveguide, and
said pockets being open at the top as they travel through said waveguide.

16. Apparatus as set forth in claim 15 wherein
the length of said pockets is less than the length of said capsules whereby said capsules extend upwardly from said pockets.

* * * * *